P. H. McCOURT.
SPRING WHEEL.
APPLICATION FILED NOV. 24, 1917.
1,286,369. Patented Dec. 3, 1918.
Fig. 1
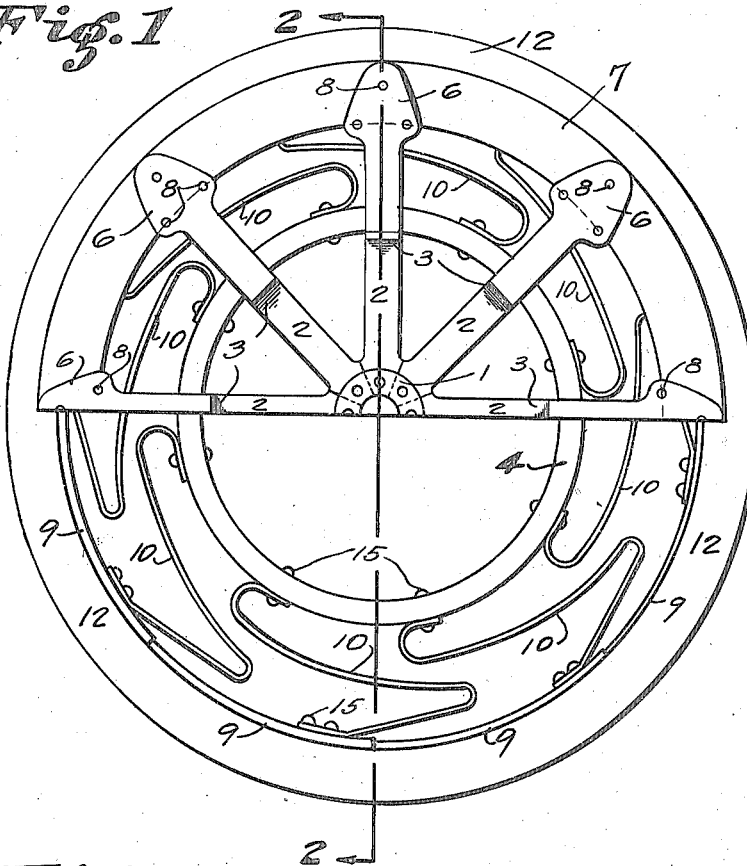
Fig. 2
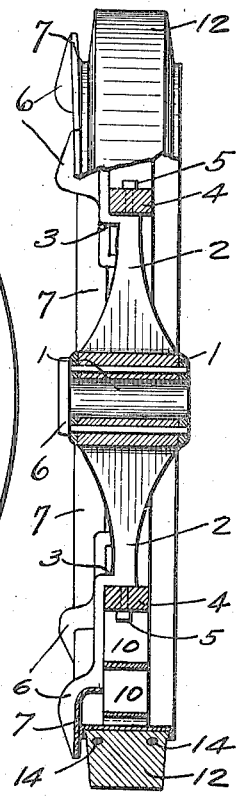
Fig. 3
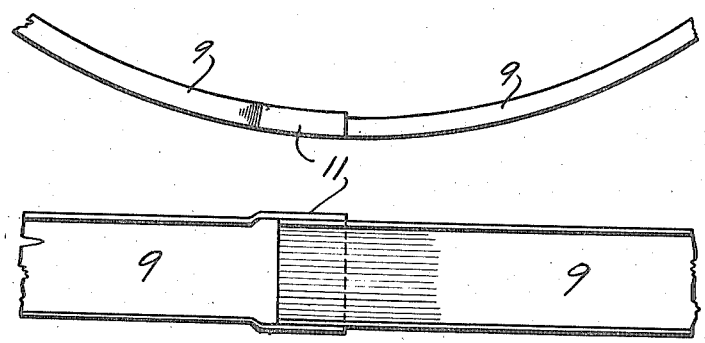
Fig. 4
Inventor
Patrick H. McCourt.
By John C. Higdon
Attorney.

UNITED STATES PATENT OFFICE.

PATRICK HENRY McCOURT, OF ST. LOUIS, MISSOURI.

SPRING-WHEEL.

1,286,369.　　　　　　Specification of Letters Patent.　　　Patented Dec. 3, 1918.

Application filed November 24, 1917. Serial No. 203,701.

*To all whom it may concern:*

Be it known that I, PATRICK HENRY MCCOURT, a citizen of the United States, and resident of St. Louis, Missouri, have invented certain new and useful Improvements in Spring-Wheels, of which the following is a specification, containing a full, clear, and exact description, reference being had to the accompanying drawings, forming a part hereof.

My invention relates to an improved spring wheel, and it consists in the novel construction and combination of parts hereinafter particularly described and claimed.

The object of my invention is to provide an improved spring wheel, which will avoid the necessity of using the expensive pneumatic tire, while affording the requisite resiliency for durability and comfort, and which wheel will be simple in construction, not liable to get out of order during use, and yet be of low cost.

In the drawings,

Figure 1 is a side-elevation of a spring wheel constructed in accordance with my invention, the lower half of the guard-ring and spokes being shown as cut off and removed, to afford a better view of the parts.

Fig. 2 is a vertical section of the principal parts of the wheel, looking in the direction indicated by the arrows of the line 2—2 of Fig. 1.

Fig. 3 is a detail edge-view of two sections of the sectional rim, and

Fig. 4 is a plan view of the said rim sections, showing the form of the telescopic joint at the ends of said sections.

The numeral 1 designates any common form of a hub, to which the inner ends of the spokes 2 are connected in any ordinary manner, the outer portions of said spokes being formed with offsets 3 which rest firmly upon the inner periphery of a strong metal ring 4, and are secured to said ring by suitable fastening devices, such as bolts, screws or pins 5.

Radial extensions of said spokes beyond the said offsets 3 are provided at their outer ends with enlargements or heads 6, which are curved to fit the side and edge of a guard-ring 7 which is L-shaped in cross-section. Suitable rivets 8 are used to fasten the said heads 6 to the said guard-ring 7; or, if preferred by the manufacturer, these heads may be welded to said ring by any well-known electric-welding apparatus.

The tire-rim is made in segmental sections 9, there being preferably a separate section for each one of the S-shaped steel springs 10, and each section is provided with an enlarged socket 11 in which the end of the adjacent section is telescopically located, whereby all of said sections may move relative to each other, and form a flexible rim, capable of expanding and contracting during operation upon the road or street.

The said expanding and contracting flexible rim is, in the present illustration of my invention, made substantially U-shaped in cross-section, to receive the ordinary solid rubber tire 12, which is held in place by the usual wires 14, or by any other common or usual means.

The said S-shaped springs 10 have their inner ends secured to the outer periphery of the said ring 4, and their outer ends fixed to the inner surface of the sections, by rivets 15 or other common means.

The operation of my invention will be readily apparent, and further description is unnecessary except to point out that the hub 1, spokes 2, ring 4, and guard-ring 7, are all supported by the said springs, and will move together during operation, the resiliency of said springs permitting a free movement of said parts as a whole independently of the rim sections 9 and the solid tire 12, the said guard-ring 7 sliding up and down at the outer edge of the said rim sections and tire, and protecting the same as well as the outer ends of the springs from injury by contact with the curb or other obstructions, as well as preventing the entrance of mud and dirt to the space between the springs and the rim sections.

I claim:

1. An improved spring wheel, composed of a suitable hub, spokes having offsets, spoke-extensions projecting radially from said offsets, a strong ring to which said offsets are attached, a rim, resilient devices located in the space between said ring and said rim, and a guard-ring extending around the edge of said rim and secured to the outer ends of said spoke-extensions.

2. An improved spring wheel, composed of a suitable hub, spokes having offsets, spoke-extensions projecting radially from said offsets, a strong ring to which said offsets are attached, a flexible contracting and expanding rim made of telescopic-sections, resilient devices located in the space between said strong ring and said rim, and a guard-ring to which the outer portions of said spoke-extensions are secured, said guard-ring extending around the edge of the said telescopic rim-sections, to protect same from dirt and injury.

In testimony whereof I have signed my name to this specification in presence of two subscribing witnesses.

PATRICK HENRY McCOURT.

Witnesses:
 FRANCES HOOVER ROSENBAUM,
 JOHN C. HIGDON.